United States Patent [19]
Toth et al.

[11] Patent Number: 5,302,069
[45] Date of Patent: Apr. 12, 1994

[54] STEPPED, CAPPED WHEEL NUT

[75] Inventors: John A. Toth, Orchard Lake, Mich.;
Glenn A. Snowberger, Ontario,
Canada; Richard W. Guillod,
Bingham Farms; John M. Liston,
Southfield, both of Mich.

[73] Assignee: Key Manufacturing Group, Inc.,
Royal Oak, Mich.

[21] Appl. No.: 953,102

[22] Filed: Sep. 29, 1992

[51] Int. Cl.⁵ .......................................... F16B 37/14
[52] U.S. Cl. ................................. 411/429; 411/373; 411/910
[58] Field of Search ............... 411/429, 430, 431, 371, 411/373, 375, 376, 377, 910, 405; 81/185, DIG. 11

[56] References Cited

U.S. PATENT DOCUMENTS

| | | | |
|---|---|---|---|
| 2,018,301 | 10/1935 | Ferry | 411/430 |
| 4,018,133 | 4/1977 | Chaivre | 411/429 |
| 4,123,961 | 11/1978 | Chaivre | 411/429 |
| 4,616,535 | 10/1986 | Chiavon | 411/405 |
| 4,764,070 | 8/1988 | Baltzell | 411/430 |
| 4,955,773 | 9/1990 | Toth | 411/429 |
| 5,028,093 | 7/1991 | Nason | 411/373 |
| 5,048,898 | 9/1991 | Russell | 411/429 |

Primary Examiner—Flemming Saether
Attorney, Agent, or Firm—Spencer, Frank & Schneider

[57] ABSTRACT

A capped wheel nut formed of a cap and a nut insert which, when engaged, rotate together such as for removably engaging a wheel to a threaded stud of a hub of a vehicle. The capped wheel nut is rotated by a standard tool which applies a rotational force to the cap. Should the cap become disengaged from the nut insert, then the nut insert may be rotated by a standard tool which applies a rotational force to the nut insert in the absence of the cap.

14 Claims, 2 Drawing Sheets

STEPPED, CAPPED WHEEL NUT

BACKGROUND OF THE INVENTION

1. Field of the Invention

This invention is related to the field of fastening devices preferably for securing a wheel to a vehicle and, more particularly, to a composite nut and decorative cap for fastening a wheel to a threaded stud of a vehicle hub.

2. Description of the Related Art

In the development of functional hub caps and wheel fasteners for vehicles, a decorative art has emerged. Wheel covers of various shapes designs, and compositions (alloys) are now readily available and are popular options on various vehicles to accentuate appearance.

In addition to distinctive wheel covers, decorative nut caps have been designed to complement the wheel covers. The nut caps cover the nuts which nuts are frequently called nut inserts. The nut and cap combination fasten the wheel to the threaded studs of a vehicle hub. In addition to a decorative effect, the nut caps protect the nut inserts from adverse effects of the weather, such as rusting, etc.

In the prior art fasteners, nut caps have been variously top welded (U.S. Pat. No. 4,123,961), crimped (U.S. Pat. No. 3,364,806) flange welded (U.S. Pat. No. 4,775,272) and glued onto the nut inserts such that the cap will provide the decorative and protective functions. The exterior sides of the nut cap are provided with wrenching surfaces referred to as wrench flats. A nut-rotating wrench is then applied to the wrench flats of the cap to rotate the combination nut cap and nut insert to tighten or loosen the wheel to the vehicle hub. The cap and nut insert rotate together to provide the desired mechanical function. Each of the foregoing patents is incorporated by reference.

Despite the many creative ways for fastening the nut insert and the nut cap together, the nut cap sometimes becomes separated from the nut insert. The tensile and shear strength of the adhesive may be too low and give way; salt and/or water may work between the nut cap and the nut and cause rusting which can cause separation of the nut cap and the nut insert in response to the stress of repetitive loosening or tightening the nut on the stud; and a small percentage of these fasteners may separate despite manufacturing precautions. Irrespective of the cause of the separation, its effect upon the user of the capped wheel nut is significant. Although the nut cap is designed to fit a standard size nut-rotating wrench, when the nut cap disengages from the nut insert, it is difficult, if not impossible to rotate the nut insert because the nut insert, which is positioned inside the cap, is "undersized", i.e., smaller than the standard nut-rotating wrench. This unexpected dilemma can be both frustrating and dangerous for a stranded vehicle operator who is unable to change a flat tire on the vehicle once a nut cap has been dislodged from the nut insert because the standard wrench does not properly engage the "undersized" nut insert.

It is an object of this invention to provide a simple but effective way of addressing the problem of providing a decorative and functional cap and wheel nut insert combination, yet in the case of the cap being separated from the wheel nut insert, to provide a suitable remedy for enabling rotation (and thus tightening or loosening) of the non-capped wheel nut insert.

SUMMARY OF THE INVENTION

The above and other objects of the invention are, according to the present invention, accomplished by the provision of a capped wheel nut for retaining a wheel on a vehicle where the capped wheel nut comprises a cap and a nut insert with the cap and nut insert rotatable together, where the cap is rotated by a standard nut-wrenching implement, and where, if the cap becomes separated from the nut insert, the nut insert may separately be rotated by a standard or specially-designed nut-wrenching implement. The same nut-wrenching implement may be used to separately rotate the cap and the nut insert, although the present invention contemplates that a cap and nut insert may be rotated with different nut-wrenching implements.

The present invention further provides a capped wheel nut comprising a cap and a nut insert engaged to rotate together, the nut insert having first and second ends and first and second exterior portions, and the cap having first and second exterior portions, where one of the cap exterior portions is engageable by a rotating tool and one of the nut insert exterior portions is engageable by a rotating tool, wherein the same tool may be used to separately rotate both the cap and the nut insert, although, again, the cap and nut insert may be rotated by different rotating tools.

The present invention further provides a capped wheel nut for removably retaining a wheel on a vehicle comprising a nut insert and a cap, the nut insert having first and second longitudinal portions of different exterior operating widths, the first portion having a smaller operating width than the second portion, and one portion of the nut insert is configured to cooperate with a standard nut-rotating wrench, and wherein the cap has first and second longitudinal portions of different exterior operating widths, the first portion having a smaller operating width than the second portion, and one portion of the cap is configured to cooperate with a standard nut-rotating wrench. Again, the standard nut-rotating wrenches need not be the same for the cap and the nut insert although the present invention contemplates that the same nut-rotating wrench may be used for both the cap and nut insert.

In one embodiment, the cap and nut insert may each be hexagonal shaped, in plan view, to provide standard wrench flats for a nut-rotating wrench. Further, in one embodiment the same nut-rotating wrench may be used to rotate the composite capped wheel nut and to rotate the nut insert after the cap has been removed.

In a further aspect of the invention there is provided a capped wheel nut for retaining a wheel on a vehicle comprising a cap and a nut insert, the nut insert having first and second ends and an external shoulder between the first and second ends defining first and second portions of the nut insert, the outer operating width of the nut insert second portion being larger than the outer operating width of the nut insert first portion; and the cap, which is mounted on the nut insert for rotation with the nut insert, has first and second ends and an external shoulder between the first and second ends defining first and second portions of the cap, the outer operating width of the cap second portion being larger than the outer operating width of the cap first portion. In one specific form of this embodiment, the outer operating width of the cap first portion is substantially the same as the outer operating width of the nut insert second portion. In another specific form of this embodiment, the outer operating width of the cap first portion is different from the outer operating width of the nut insert second portion.

BRIEF DESCRIPTION OF THE DRAWINGS

The foregoing features and benefits of the present invention, together with other objects and advantages which may be attained by use of the present invention, will become apparent and will be better understood upon reading the following detailed description of the invention taken in conjunction with the drawings. In the drawings, wherein like reference numerals identify corresponding components.

DETAILED DESCRIPTION OF THE INVENTION

Figure 1:
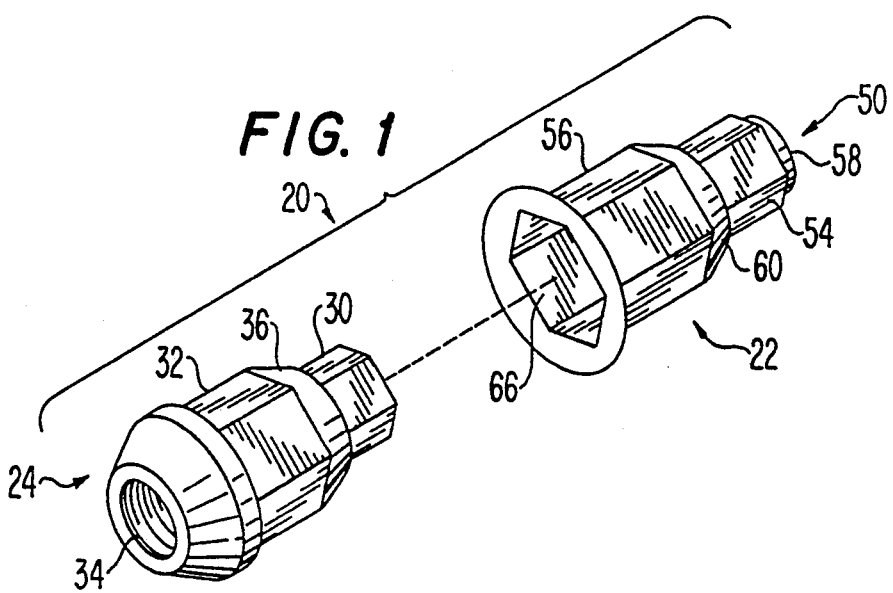
FIG. 1 is a perspective, exploded illustration of a cap and nut insert in accordance with the present invention.

Referring now to the drawings, there is shown in FIG. 1 a perspective, exploded illustration of a capped wheel nut 20 including a cap 22, preferably made of stainless steel, and a nut insert 24 preferably formed of carbon steel. The nut insert 24 may be referred to as the nut body. The present invention contemplates caps and nut inserts of the same or different materials. For example, the cap may be made of plastic and the nut insert made of metal. The present invention further contemplates caps and nut inserts of the same materials with different finishings or coatings.

Figure 2:
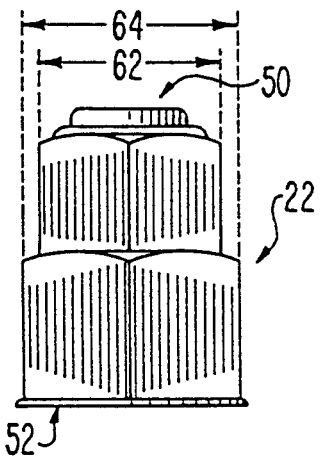
FIG. 2 is a front elevation view of a cap in accordance with the present invention.
Figure 3:
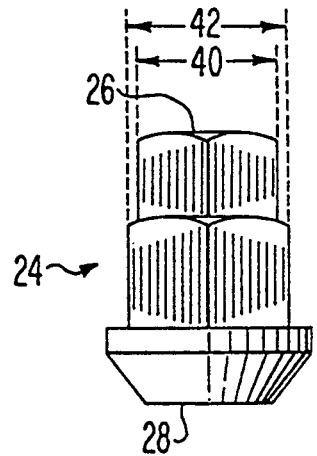
FIG. 3 is a front elevation view of a nut insert in accordance with the present invention.

As illustrated in FIG. 1 and in greater detail in FIG. 3, the nut body 24 is a generally elongated member having a first end 26 and a second end 28. The length of the nut body has first and second longitudinal portions 30, 32, respectively, and the nut body has a central, longitudinal, internally threaded bore 34. The threads may extend the full interior length of the nut body. Alternatively, the threads may extend only a short distance inwardly from the second nut insert end 28 and a counterbore may be provided extending inwardly from the first nut insert end 26. The nut body includes an external shoulder 36, intermediate the two ends, with the shoulder generally defining the junction of the two longitudinal portions. The exterior of the first longitudinal portion of the nut body is formed of polygonal shape, in plan view and may be of hexagonal shape as is conventional for wheel nuts in general, thus providing six exterior wrenching surfaces which are called wrench flats. The first longitudinal portion 30 has an external "operating width" 40, which, in the case of a polygonal shaped longitudinal portion is actually the distance as measured across opposed wrench flats. The exterior of the second longitudinal portion of the nut body is formed of polygonal shape, in plan view and may be of hexagonal shape as is conventional for wheel nuts in general. The second longitudinal portion 32 has an external operating width 42, measured across opposed wrench flats. In the embodiment illustrated in FIGS. 1 through 3, the external operating width 42 is greater than the external operating width 40.

The cap 22 is illustrated in FIG. 1 and illustrated in greater detail in FIG. 2. The cap has is a generally thin-walled, hollow, elongated member having a first end 50 and a second end 52. The length of the cap is preferably divided into first and second longitudinal portions 54, 56, respectively, and is closed at the first end 50 such as by a dome 58. Such a closure is optional and the present invention contemplates caps which are initially opened and are closed by fillers which may be formed of plastic. The cap includes an external shoulder 60, intermediate the two ends, with the shoulder generally defining the junction of the two longitudinal portions. The exterior of the first longitudinal portion of the cap is formed of polygonal shape, in plan view and may be of hexagonal shape as is conventional for wheel nuts in general. The first longitudinal portion 54 has an external operating width 62, which is the distance measured across opposed wrench flats. The exterior of the second longitudinal portion of the cap is formed of polygonal shape, in plan view and may be of hexagonal shape as is conventional for wheel nuts in general. The second longitudinal portion 56 has an external operating width 64, which is the distance measured across opposed wrench flats. In the embodiment illustrated in FIGS. 1 and 2, operating width 64 is greater than operating width 62.

The operation of the capped wheel nut of the present invention will now be explained. Means are provided to engage the cap and nut body such that they rotate together in response to a rotational force. In the form of the invention illustrated in FIGS. 1, 2 and 3, the cap and nut body are sized such that the nut body fits within the interior 66 of the cap. The cap may be secured to the nut body by a force fit, by top welding, gluing, flange welding, or other conventional techniques. Alternatively, even with a loose fit, the polygonal sides of the cap and the polygonal sides of the nut insert provide the result that, in response to a nut-wrenching or rotational force on the cap, the cap and nut insert rotate together such that the second end 28 of the nut insert may be threaded onto a conventional threaded stud on the hub of a vehicle to retain a wheel on the vehicle.

According to the principles of one form of the present invention, the operating width 62 of the cap first portion is a standard size, relative to conventional nut-wrenching tools, such as ¾ inch for parts specified in the United States or 19 mm for parts specified in the metric system. Nut-wrenching tools furnished with vehicles are manufactured in various standard sizes and, of course, there are standard sizes for socket wrenches and open-end wrenches. The operating width 42 of the nut insert second longitudinal portion is, preferably, the same as the operating width 62 of the cap first portion. Hence in the event that the cap becomes accidentally separated from the nut insert, the same nut-wrenching tool which was used to rotate the capped wheel nut can engage the wrench flats on the nut body second longitudinal portion.

To exemplify the breadth of the present invention, the following examples may be helpful. For the purpose of explanation, presume that the thickness of the stainless steel cap is 0.020 inches. In the example just presented, the cap first operating width 62 would be 0.7500 inches and cap second operating width would be 0.7900 inches. The cap may be rotated by a standard 0.7500 inch (¾ inch) wrench. In this example, the nut insert first operating width 40 would be 0.7100 inches and the nut insert second operating width 42 would be 0.7500 inches. The nut insert second operating width may be rotated by the same standard size 0.7500 (¾ inch) wrench. The cap fits snugly on the nut insert and the difference in operating width between corresponding portions of the cap and nut insert is twice the thickness of the cap (because the cap encircles the nut insert and thus "twice" the cap thickness is within the operating width of the cap).

If the cap and nut insert were made to metric measurements, the cap operating widths would be 19 mm and 20 mm, respectively, and the nut insert operating widths would be 18 mm and 19 mm, respectively, and a conventional 19 mm wrench would rotate the cap smaller operating width and, in the absence of the cap, the same wrench would rotate the nut insert larger operating width.

Having thus illustrated the principles of the present invention, it should be appreciated that numerous modifications are available to those skilled in the art. Again, presume that the thickness of the stainless steel cap is 0.020 inches. The cap first operating width 62 would be 0.750 inches and the cap second operating width would be 0.8525 inches. In this example the cap may be rotated by a standard 0.7500 inch (¾ inch) wrench. In this example, the nut insert first operating width 40 would be 0.7100 inches and the nut insert second operating width 42 would be 0.8125 inches. The nut insert second operating width may be rotated by a standard size 0.8125 (13/16 inch) wrench. The cap fits snugly on the nut insert and the difference in operating width between corresponding portions of the cap and nut insert is twice the thickness of the cap (because the cap encircles the nut insert and thus "twice" the cap thickness is within the operating width of the cap). In this example, two different wrenches, both of standard size are used where one wrench rotates the cap and the second rotates the nut insert (in the absence of the cap).

In another example, the cap first operating width 62 would be 0.4775 inches and cap second operating width would be 0.500 inches. Hence the cap may be rotated by a standard 0.500 inch (½ inch) wrench. In this example, the nut insert first operating width 40 would be 0.4375 inches and the nut insert second operating width 42 would be 0.460 inches. The nut insert first operating width may be rotated by a standard size (7/16 inch) wrench. The cap fits snugly on the nut insert and the difference in operating width between corresponding portions of the cap and nut insert is twice the thickness of the cap (because the cap encircles the nut insert and thus "twice" the cap thickness is within the operating width of the cap).

Thus, considering, for example, the embodiment of FIGS. 1, 2 and 3, the operating width 62 of the first cap portion need not be identical to the operating width 42 of the second nut insert portion as long as both operating widths are rotatable by suitable nut-wrenching tools. A tight fit, and even a flange weld between the cap and nut insert may be preferable for various reasons but as long as the cap and nut rotate together the objectives of the present invention may be achieved.

In yet another modification of the present invention, the cap may be of constant operating width and the nut insert of constant operating width (i.e., the shoulders are eliminated), each operating width may be a standard size, with the thickness of the cap accommodating the difference in operating widths. For example, if the cap has a thickness of 1 mm, the cap operating width would be 21 mm and the nut insert operating width 19 mm, each of which is a standardized metric size for nut-rotating wrenches.

Figure 4:
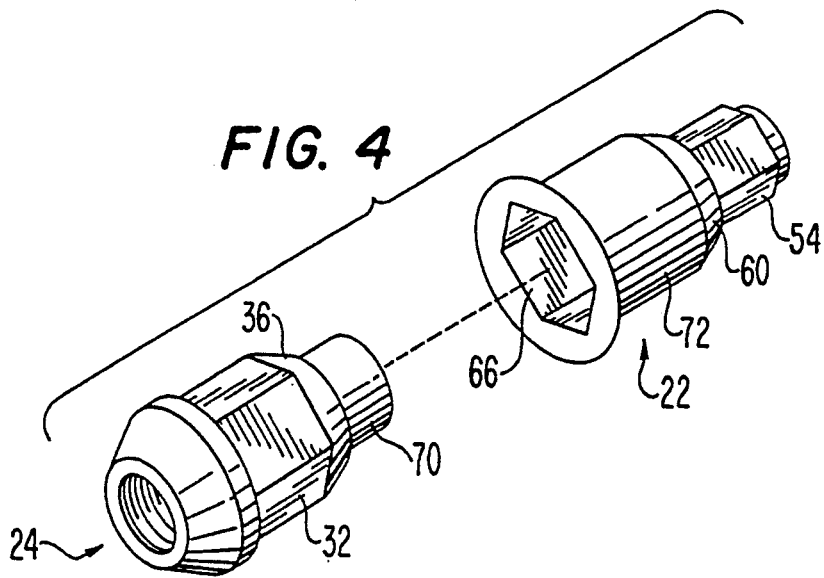
FIG. 4 is a perspective, exploded illustration of another embodiment of a cap and nut insert in accordance with the present invention.

Reference should now be had to FIG. 4 of the drawings where yet another embodiment of the present invention is illustrated. In this embodiment, the first longitudinal portion 70 of the nut body or nut insert 24 is circular in plan view, rather than polygonal, and the second longitudinal portion 72 of the cap 22 is circular in plan view. Again, according to the principles of the present invention, the operating width 62 of the cap first portion 54 is a standard size and the operating width 42 of the nut insert second portion 32 is a standard size (and these two operating widths 42, 62 may even be the same size although that is not required according to the present invention) such that suitable tools can rotate the capped wheel nut and, in the event that the cap becomes separated from the nut insert, a suitable tool can rotate the nut insert.

Figure 5:
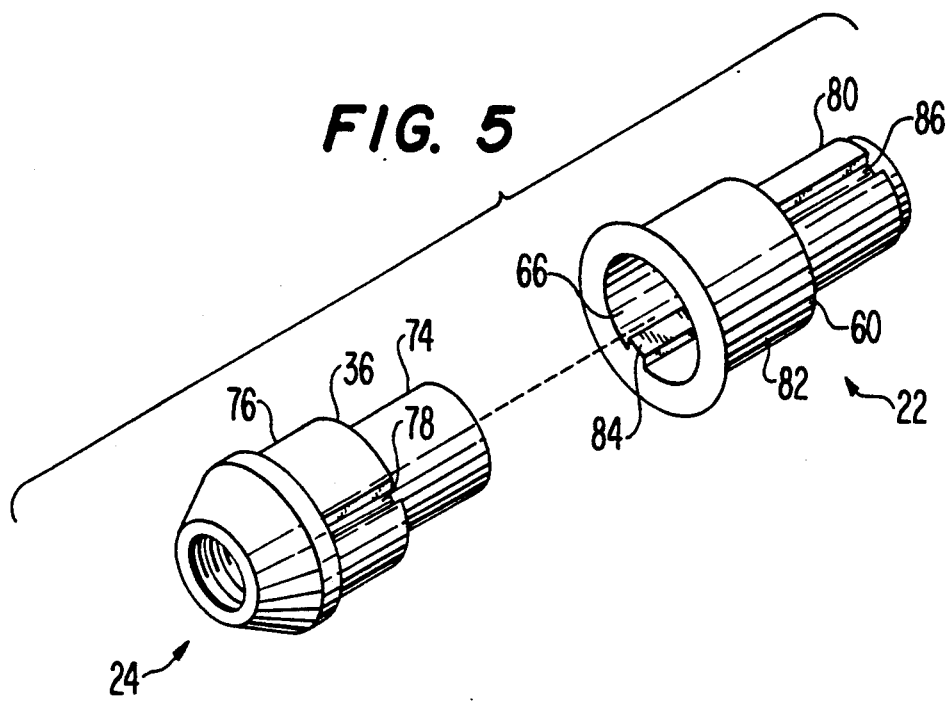
FIG. 5 is a perspective, exploded illustration of another embodiment of a cap and nut insert in accordance with the present invention.

Referring next to FIG. 5, yet another form of the present invention is illustrated. Nut insert 24 has first and second longitudinal portions 74, 76, separated or divided by a shoulder 36, with both portions being circular in plan view. The second portion 76 includes an elongated keyway 78. The cap 22 has first and second longitudinal portions 80, 82, separated or divided by a shoulder 60, again with both portions being circular in plan view. The hollow interior 66 of the cap includes an elongated, axially positioned key 84 which is configured to fit in the keyway 78 when the cap is mounted on the nut insert such that the cap and nut insert are engaged to rotate together. The first portion 80 of the cap includes an elongated external keyway 86. The operating width of the cap first portion is a standard size and the operating width of the nut insert second portion is a standard size; for convenience these two operating widths may be the same size but that is not a requirement of the present invention. A tool having a circular opening and an internal, axially positioned key, fits on the cap first portion, with the key of the tool engaging the keyway 86 of the cap, such that a nut-wrenching, rotational force may be applied. The rotational force is transmitted through the key 84 of the cap and through the keyway 78 of the nut insert such that the cap and nut insert rotate together. In the event that the cap becomes separated from the nut insert, the tool may be used to rotate the nut insert alone, since the tool includes a key to engage the keyway 78 of the second portion of the nut insert.

It is further within the spirit and scope of the present invention that the cap may include a recess in the dome, and the top of the nut insert have a similar recess, such that rotational forces can be applied from a tool which engages the cap at its end and, with the cap removed from the nut insert, the tool engages the nut insert at its end. In such an embodiment, the bore of the nut insert will not extend the full length of the nut insert. Typical examples of tools which engage the parts at their ends would be specially formed keys used for capped locknuts for vehicles. In applications where less torque is required, specially shaped screwdrivers may be utilized according to the principles of the present invention.

Figure 6:
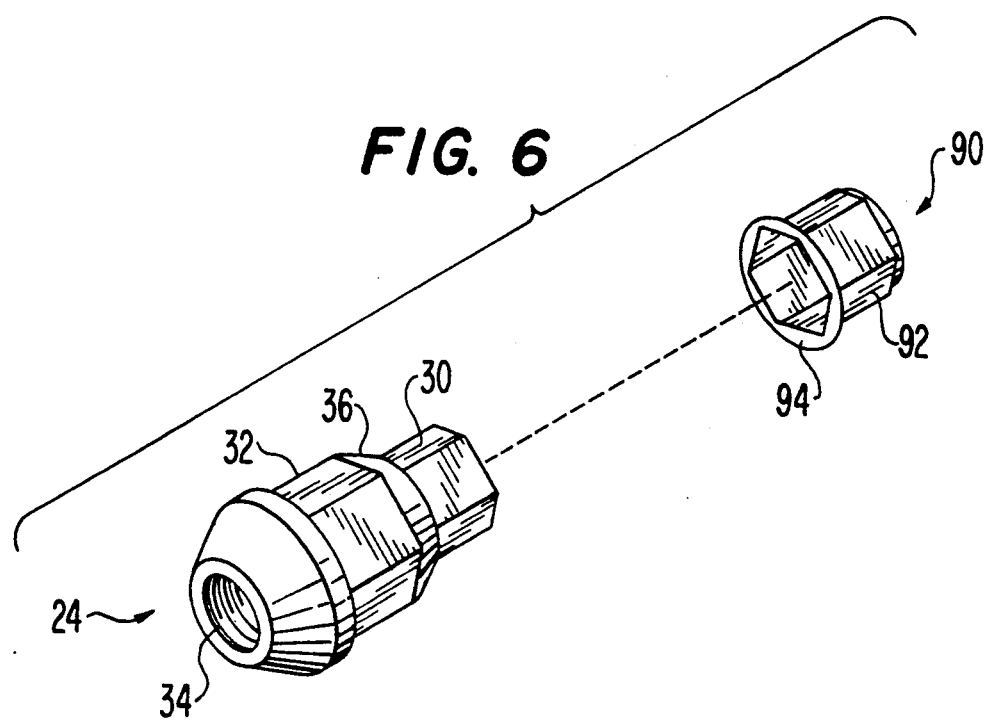
FIG. 6 is a perspective, exploded illustration of yet another embodiment of a cap and nut insert in accordance with the present invention.

Referring next to FIG. 6, still another embodiment of the present invention is illustrated. In this embodiment, the cap 90 has a first portion 92 which, is illustrated as being polygonal and specifically hexagonal in plan view. The first portion terminates in an optional outwardly extending flange 94 at the second end of the cap. The cap of this embodiment is mounted only to the first portion 30 of a nut insert 24 and may be top welded to the nut insert, in which event flange 94 is not required. Alternatively, the cap flange 94 may be flange welded, such as to a shoulder 36, on the nut insert, in which event, of course, a flange or equivalent structure is required. Again, a suitable tool provides a rotating force on cap portion 92 such that the cap and nut insert rotate together. The same tool, or a different sized tool, engages the nut insert second portion 32 to rotate the nut insert after the cap has become disengaged from the nut insert.

The foregoing is a complete description of the present invention. Many modifications and combinations of the present invention may be made in light of the above teachings without departing from the spirit and scope of the present invention. Thus the present invention should be limited only by proper interpretation of the following claims.

What is claimed is:

1. A capped wheel nut for retaining a wheel on a vehicle comprising:
   a nut insert having first and second ends, the first one of said ends for engaging a vehicle wheel, the nut insert having at least first and second axially spaced apart exterior portions; and
   a cap mounted to said nut insert and covering the second one of said ends and said first and second exterior portions of the nut insert, for rotation with said nut insert, the cap having at least one exterior portion;
   wherein:
   said at least one cap exterior portion is engageable by a tool for applying a rotational force to the cap for rotating the cap and nut insert; and
   said nut insert second exterior portion is the same size as said at least one cap exterior portion and is engageable by the same tool as said at least one cap exterior portion, whereby the same tool may be used to apply a rotational force to the nut insert in the absence of the cap to rotate the nut insert.

2. The invention as defined in claim 1 wherein the at least one cap exterior portion and the nut insert second exterior portion are wrench flats of the same size and shape and are thereby both engageable by the same conventional wrench.

3. The invention as defined in claim 1 wherein said at least one cap exterior portion comprises first and second exterior portions, the first cap exterior portion being the same size as the nut insert second exterior portion.

4. The invention as defined in claim 3 wherein
   said nut insert has a shoulder between said first and second ends defining the first and second exterior nut insert portions, an outer operating width of said nut insert second exterior portion being greater than an outer operating width of said nut insert first exterior portion; and
   said cap has first and second ends and a shoulder between said first and second ends defining the first and second exterior cap portions, an outer operating width of said cap second exterior portion being greater than an outer operating width of said cap first exterior portion; and
   the outer operating width of the cap first exterior portion and the outer operating width of the nut insert second exterior portion are the same size.

5. The invention as defined in claim 3 wherein the first exterior portion of the cap is polygonal in plan view.

6. The invention as defined in claim 3 wherein the first exterior portion of the cap is hexagonal in plan view.

7. The invention as defined in claim 1 wherein the nut insert has a threaded internal bore for engaging a vehicle wheel threaded shaft.

8. The invention as defined in claim 7 wherein threads on said nut insert bore extend the full length of the bore.

9. The invention as defined in claim 7 wherein said bore is centrally disposed along a longitudinal axis of said nut insert.

10. The invention as defined in claim 1 wherein the cap includes a longitudinal keyway disposed in said at least one exterior portion thereof.

11. The invention as defined in claim 1 wherein nut insert includes a longitudinal keyway disposed in said second exterior portion thereof.

12. The invention as defined in claim 1 wherein:
    the cap includes interior surfaces which are hexagonal in cross-section; and
    the nut insert first and second exterior portions, include surfaces which are hexagonal in cross-section and engage the interior surfaces of said cap;
    whereby rotation of said cap produces concomitant rotation of said nut insert.

13. The invention as defined in claim 1 wherein said nut insert first and second exterior portions are of different dimensions.

14. The invention as defined in claim 1, wherein the exterior portions of the nut insert and cap are sized to accommodate standard size nut-rotating wrenches.

* * * * *